Jan. 19, 1932.　　　J. NORWORTH　　　1,841,844
APPARATUS FOR SCENIC EFFECT
Filed Jan. 8, 1931　　2 Sheets-Sheet 1

Inventor
Jack Norworth
By his Attorney

Jan. 19, 1932.   J. NORWORTH   1,841,844
APPARATUS FOR SCENIC EFFECT
Filed Jan. 8, 1931    2 Sheets-Sheet 2
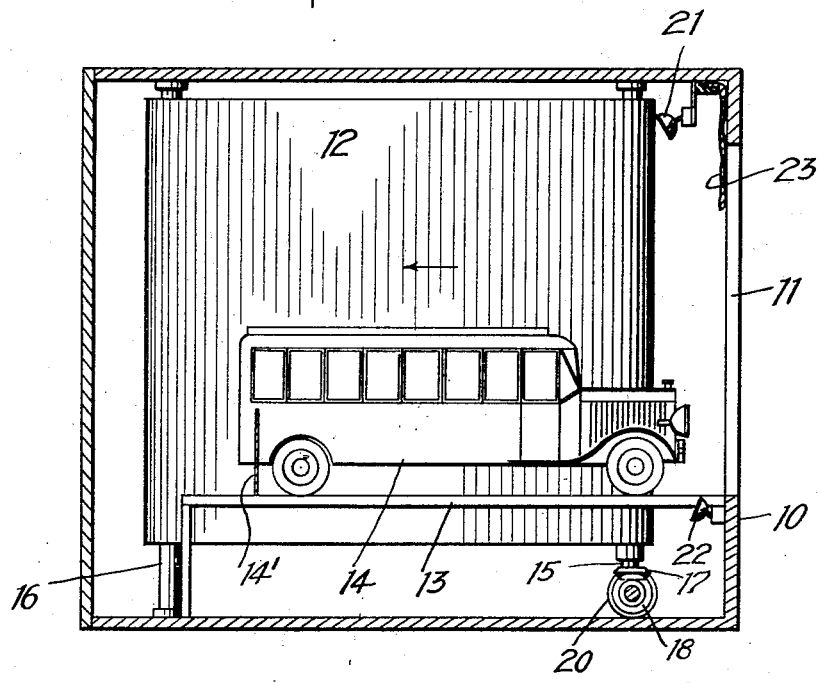
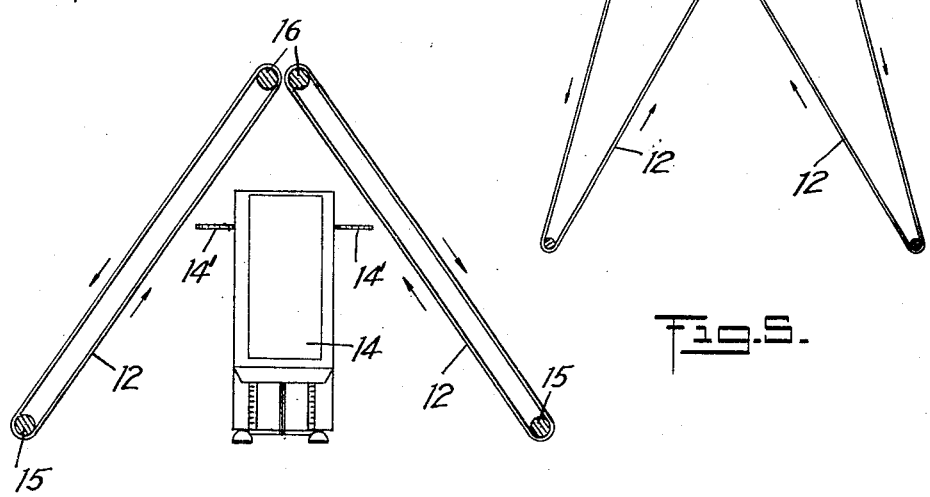
Inventor
Jack Norworth
By his Attorney Patented Jan. 19, 1932

1,841,844

UNITED STATES PATENT OFFICE

JACK NORWORTH, OF NEW YORK, N. Y.

APPARATUS FOR SCENIC EFFECT

Application filed January 8, 1931. Serial No. 507,328.

This invention relates to improvements in an apparatus for producing scenic effects, and more particularly adaptable as an advertising scheme.

Among the principal objects which the present invention has in view are: To provide an improved apparatus for producing an illusionary effect of an automobile or other vehicle travelling, though in a still position; to produce the said effect by assistance of movable curtains; to produce a perspective effect of the scenery with the automobile or the like; to produce an effect of continuous travel for the vehicle; to secure simplicity of construction and operation; and to obtain other advantages and results as may be brought out in the following description.

In the drawings:

Figure 3 is a sectional view shown as taken on the line 3—3 in Figure 1;

Figure 4 is a diagrammatic plan of the moving curtains; and

Figure 5 is a similar view in modified form.

Figure 1:
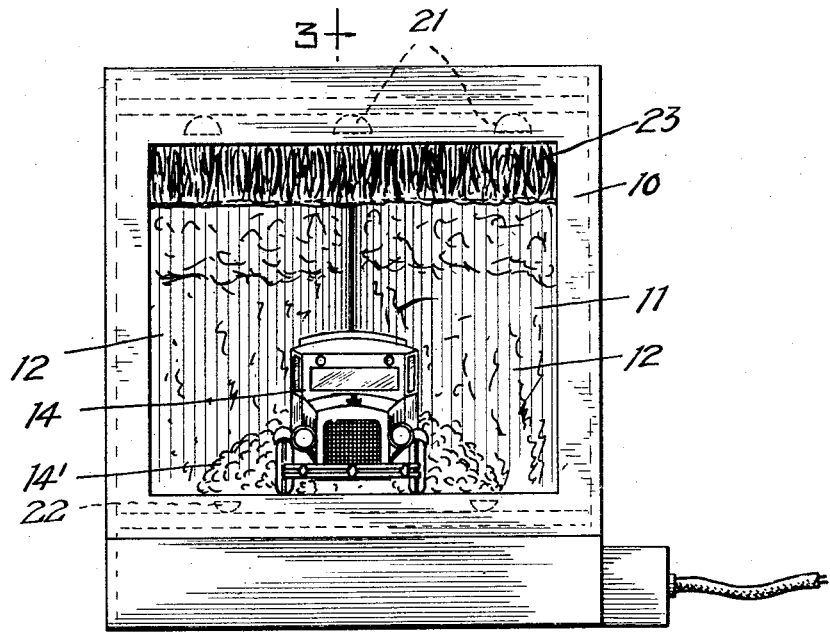
Figure 1 is a front view of the apparatus embodying my invention.

In the specification:

In the specific embodiment of the invention illustrated in said drawings, the reference numeral 10 indicates an enclosure preferably of a box-like formation having a front opening 11 representing a proscenium for a stage setting. The stage setting is within the enclosure and may be viewed through said opening, which for convenience will be referred to as at the front of the enclosure. As here shown, the enclosure provides a frame-like wall surrounding the said opening 11 so that the opening is of less width and less height than the corresponding dimensions of the enclosure.

Extending rearwardly from behind the upright portions of this frame-like front wall are a pair of movable curtains 12, 12. These curtains preferably converge rearwardly so as to substantially meet at the rear middle part of the enclosure, and the visible side of the said curtains have appropriate scenery displayed thereon, as by painting or printing, the painted scenery in combination with the convergence of the two curtains cooperating to produce a perspective effect to an observer looking through the said opening 11.

Horizontally disposed between the two converging curtains near the lower edges thereof, is a support or roadway 13. This roadway is shown substantially on the level of the lower edge of the opening 11, but may be disposed otherwise if found more desirable. This roadway provides a convenient means of support for a vehicle 14 such as a bus of miniature size in proportion to the scenery appearing on the curtains. The bus or other vehicle is intended to actually remain stationary on the support, and the curtains are intended to be moved in a rearward direction so as to produce the effect of the bus or other vehicle moving toward the observer. This effect is increased by providing scenery stationary with respect to the bus, here shown as plates 14', 14' at the sides of the bus adjacent the rear thereof and projecting laterally with respect to the bus and in parallel relation to the opening 11 of the enclosure. This scenery may very appropriately represent a cloud of dust, and as it is stationary with respect to the bus while the other scenery on the curtains move rearwardly the effect is produced of the bus actually moving with the cloud of dust following along behind.

In order to obtain a movable curtain, and preferably to make the curtain continuously moving in one direction, I have shown each curtain constructed as a continuous belt stretched between vertical rollers 15, 15 at the front and back of the enclosure respectively. The front roller is behind the front wall whereas the rear roller is adjacent the rear wall substantially midway between the side walls. One of the vertical rollers may be actuated, and as a result, the belt-like curtain will have a continuous movement in one direction as viewed through the opening 11 of the enclosure. As here shown, the two front rollers 15, 15 of the two curtains are positively actuated from a source of power, whereas the adjacent rear rollers 16, 16 merely act as idlers for holding the curtains taut and enabling them to continue around their orbits of movement with minimum retarding effect from friction. As shown more particularly in Figures 2 and 3, the lower ends of the front rollers 15, 15 have bevel gears 17, 17, thereon each in mesh with bevel gears 18, 18, respectively carried upon a horizontal shaft 19 actuated in suitable manner as by a motor 20.

Figure 2:
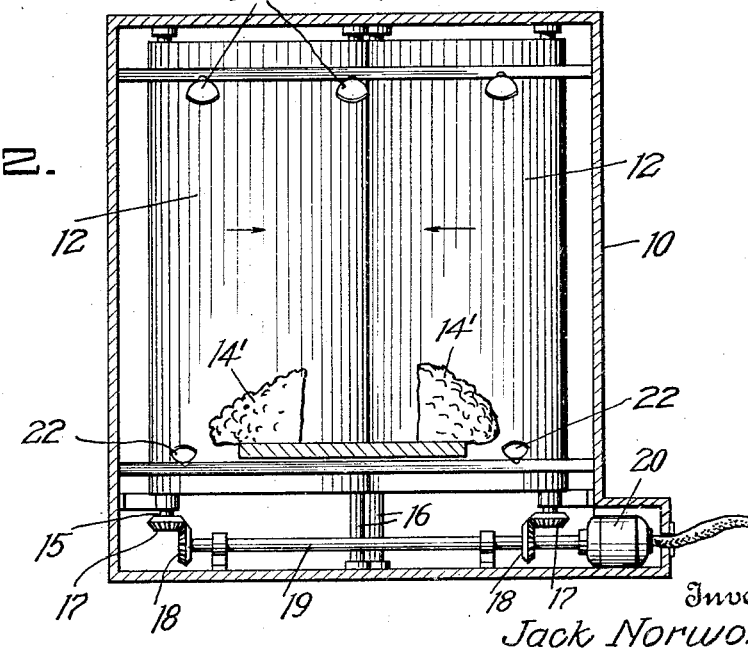
Figure 2 is a similar view with the front portion removed.

The visible portions of the curtains and the vehicle may be appropriately illuminated, and in Figures 2 and 3 are illustrated overhead lights 21, and footlights 22 positioned behind the upper and lower frame-like front wall. The upper part of the opening 11 may have a proscenium curtain or drop 23, so as to obtain a more perfect stage effect.

If it is desired to obtain a greater variation of scenery, the length of the curtain 12 may be increased as found desirable. The depth of the enclosure does not have to be increased with every increase of the length of the curtain, the curtain being given a circuitous path, as by introduction of a plurality of idler rollers 24 at any desirable part of the curtain. In view of the convergence of the two curtains, there is considerable space in the rear part of the enclosure and in Figure 5, I have illustrated the plurality of idler rollers as at the rear part of the curtain, but do not confine myself to any specific number of idler rollers or to any specific disposition thereof.

Obviously detail changes and modifications may be made in the construction and use of my improved apparatus without departing from the spirit or scope of the invention, and I do not wish to be understood as limiting myself to the exact construction shown or described except as set forth in the following claims when construed in the light of the prior art.

Claims:

1. An apparatus as characterized comprising a stationary object, and a pair of converging curtains, one of said curtains having a portion thereof toward the object movable rearwardly with respect to the object, the convergence of the curtains and the said movement of one of the curtains creating a perspective effect with respect to the object.

2. An apparatus as characterized comprising a stationary object, and a pair of converging curtains, said curtains having portions thereof toward the object movable rearwardly with respect to the object, and convergence and movement of the curtains creating a perspective effect with respect to the object.

3. An apparatus as characterized comprising a stationary object, and a pair of converging curtains, one of said curtains having a portion thereof toward the object movable rearwardly with respect to the object, the convergence of the curtains and the said movement of one of the curtains creating a perspective effect with respect to the object, and means for continuously actuating said movable curtain.

4. An apparatus as characterized comprising a stationary object, and a pair of converging curtains, said curtains having portions thereof toward the object movable rearwardly with respect to the object, and convergence and movement of the curtains creating a perspective effect with respect to the object, and means for continuously actuating said movable curtains.

JACK NORWORTH.